(12) United States Patent
Babal

(10) Patent No.: US 9,924,698 B2
(45) Date of Patent: *Mar. 27, 2018

(54) BOWL WITH ANTI-SLIP MATERIAL

(71) Applicant: Prashant Babal, Minnetonka, MN (US)

(72) Inventor: Prashant Babal, Minnetonka, MN (US)

(73) Assignee: Wazir Chand Handicrafts, Moradabad (IN)

(*) Notice: Subject to any disclaimer, the term of this patent is extended or adjusted under 35 U.S.C. 154(b) by 17 days.

This patent is subject to a terminal disclaimer.

(21) Appl. No.: 15/355,667

(22) Filed: Nov. 18, 2016

(65) Prior Publication Data

US 2017/0064922 A1    Mar. 9, 2017

Related U.S. Application Data

(63) Continuation-in-part of application No. 14/637,708, filed on Mar. 4, 2015, now Pat. No. 9,516,859.

(51) Int. Cl.
| | |
|---|---|
| *B65D 88/76* | (2006.01) |
| *A01K 5/01* | (2006.01) |
| *A01K 7/00* | (2006.01) |

(52) U.S. Cl.
CPC ............ *A01K 5/0135* (2013.01); *A01K 7/005* (2013.01)

(58) Field of Classification Search
USPC ....... 220/4.27, 23.87, 23.89, 665, 676, 23.9, 220/62.11, 62.14
See application file for complete search history.

(56) References Cited

U.S. PATENT DOCUMENTS

| | | | |
|---|---|---|---|
| 2,630,938 A | 3/1953 | Burnett | |
| 5,526,773 A * | 6/1996 | Richardson | A01K 5/0142 119/51.5 |
| 6,341,712 B1 * | 1/2002 | Huang | B65D 81/3874 220/602 |
| 6,763,962 B1 * | 7/2004 | Wang | B29C 37/0078 220/62.12 |
| 7,115,804 B1 * | 10/2006 | Campbell | G10D 7/063 84/380 B |
| 8,342,350 B2 * | 1/2013 | Jain | A01K 5/0114 220/23.83 |

* cited by examiner

*Primary Examiner* — Andrew T Kirsch
*Assistant Examiner* — Don M Anderson
(74) *Attorney, Agent, or Firm* — Brooks, Cameron & Huebsch, PLLC

(57) ABSTRACT

An anti-slip bowl is described herein. A bowl can include a rigid first shell including a base and an outer wall continuously attached to the base, a rigid second shell including a base and an outer wall continuously attached to the base, and an anti-slip material positioned between the rigid first shell and the rigid second shell and protruding through a number of openings on the rigid second shell.

17 Claims, 17 Drawing Sheets

US 9,924,698 B2

BOWL WITH ANTI-SLIP MATERIAL

CROSS REFERENCE TO RELATED APPLICATION

This application is a continuation-in-part of U.S. application Ser. No. 14/637,708, filed Mar. 4, 2015.

TECHNICAL FIELD

The present disclosure relates to a bowl with anti-slip material.

BACKGROUND

Stainless steel is an ideal material for a food and water bowl for an animal. For example, stainless steel does not readily rust, corrode, or stain when used to hold water. In addition, stainless steel does not easily scratch. A surface that is scratch-free does not as easily promote the growth of bacteria or other substances that may be harmful to the animal.

DETAILED DESCRIPTION

Embodiments of bowls with anti-slip materials are described herein. For example, one or more embodiments include a rigid first shell including a base and an outer wall continuously attached to the base, a rigid second shell including a base and an outer wall continuously attached to the base, wherein the base of the rigid second shell includes a number of non-continuous openings, and an anti-slip material positioned between a lower side of the base of the rigid first shell and an upper side of the base of the rigid second shell.

A bowl, including a stainless steel bowl, can be easily pushed around by an animal that is eating or drinking from the bowl. Therefore, it may be advantageous to include a mechanism such as an anti-slip material to prevent an animal from pushing around the bowl when the animal is eating or drinking from the bowl.

Previous approaches have used anti-slip materials that are either attached to the bowl using an adhesive or an interference fit. However, these approaches can suffer from various issues such as the anti-slip material losing adhesion to the bowl or falling out of the interference fit.

Situating an anti-slip material between two shells, in accordance with the present disclosure, may prevent the anti-slip material from becoming detached from the bowl, among other benefits. As a result, it can be much easier to clean and maintain the bowl. For example, a bowl consistent with embodiments of the present disclosure can be washed many times in a high-pressure washer (e.g., a dishwasher) without the need to remove anti-slip material in an interference fit prior to washing or worry about damaging adhesive securing an anti-slip material to the bowl.

In the following detailed description, reference is made to the accompanying drawings that form a part hereof. The drawings show by way of illustration how one or more embodiments of the disclosure may be practiced.

Figure 1:
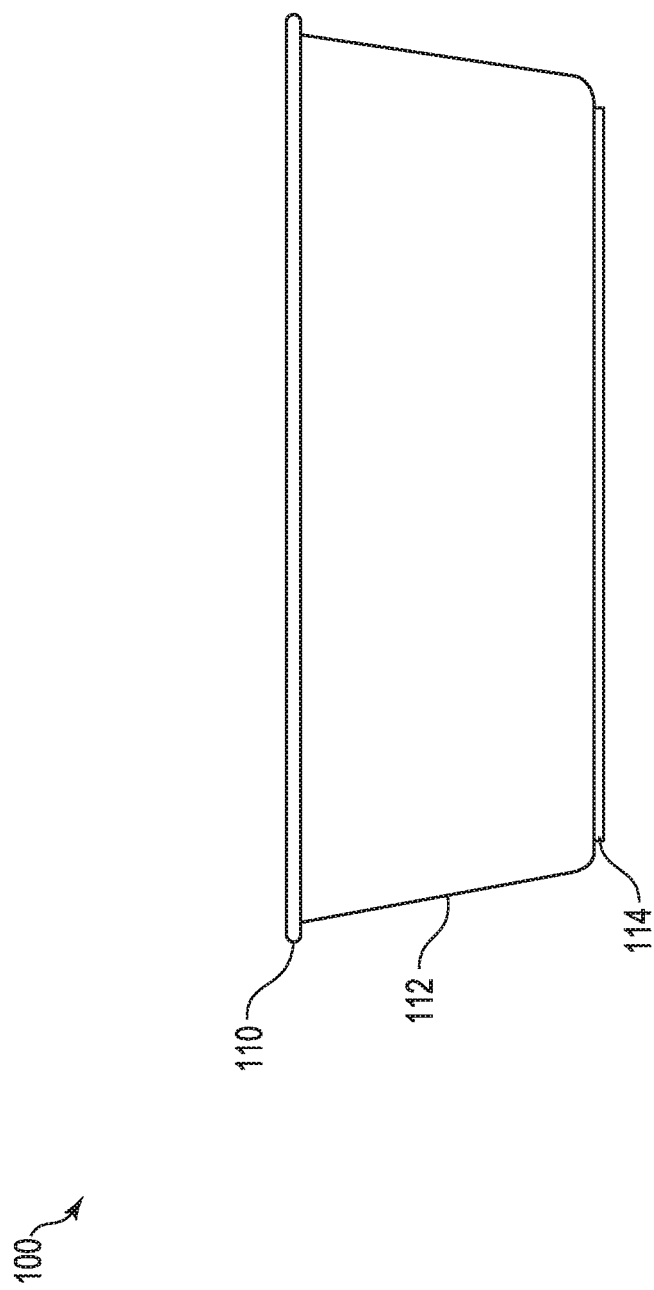
FIG. 1 illustrates a side view of a bowl with anti-slip material in accordance with one or more embodiments of the present disclosure.

Directional terms such as "upper", "lower", "downward", "upward", "horizontal", "vertical", are used with reference to the component orientation depicted in FIG. 1. These terms are used for example purposes only and are not intended to limit the scope of the appended claims.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be reference as 210 in FIG. 2.

As used herein, "a" or "a number of" something can refer to one or more such things. For example, "a number of protrusions" can refer to one or more protrusions.

FIG. 1 illustrates a side view of a bowl 100 with anti-slip material in accordance with one or more embodiments of the present disclosure. As shown in FIG. 1, the bowl 100 includes a rigid first shell 110, a rigid second shell 112, and an anti-slip material 114.

The rigid first shell 110 can be a material that is resistant to physical deterioration (e.g., scratching, pitting, and/or rusting) when subjected to use (e.g., comprising animal feed or water). For example, the rigid first shell 110 can be stainless steel. However, embodiments of the present disclosure are not so limited. For example, the rigid first shell 110 can be another material that is resistant to physical deterioration.

The rigid second shell 112 can be a plastic material. For example, the rigid second shell 112 can be an injection molded plastic or any other type of plastic material that can be formed into a rigid shell. Additionally, the type of plastic material for the rigid second shell 112 can be selected based on aesthetic considerations (e.g., color, receptiveness to paint and/or ink, etc.). In some examples, rigid second shell 112 may be a non-plastic material that can be formed into a rigid shell. For instance, the rigid second shell 112 can be a material that is resistant to physical deterioration similar to or the same as a material of the rigid first shell 110. In some examples, the rigid second shell 112 can be a stainless steel material.

The anti-slip material 114 can be a material that is resistant to movement (e.g., slipping or skidding) when experiencing a horizontal force. For example, anti-slip material 114 can be an elastomeric rubber material. However, embodiments of the present disclosure are not so limited. For example, the anti-slip material 114 can be another material that resists movement when experiencing a horizontal force.

Figure 2:
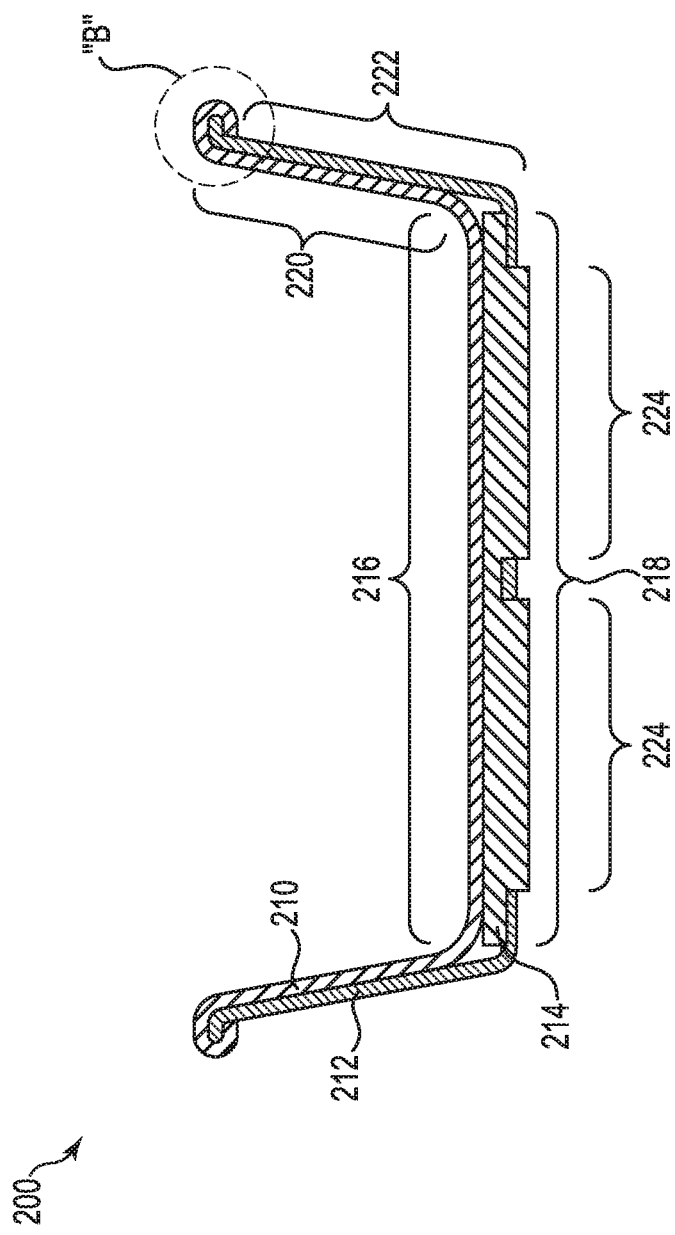
FIG. 2 illustrates a cross-sectional view of a bowl with anti-slip material in accordance with one or more embodiments of the present disclosure, taken through the line "A-A" of FIG. 5.
Figure 5:
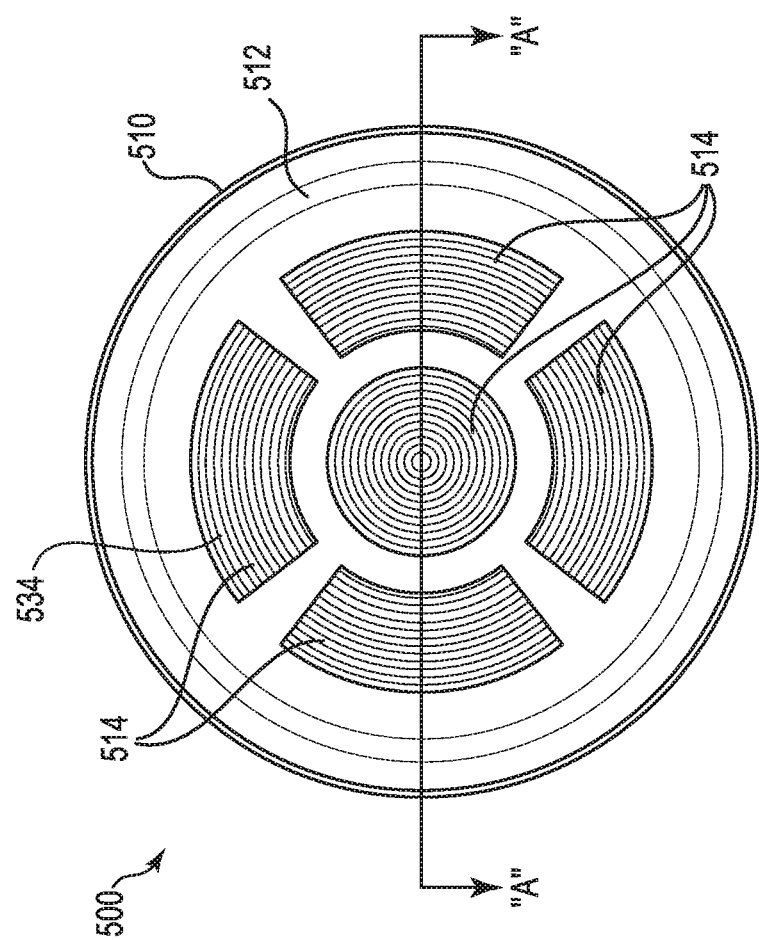
FIG. 5 illustrates a bottom view of a bowl with anti-slip material in accordance with one or more embodiments of the present disclosure.

FIG. 2 illustrates a cross-sectional view of a bowl 200 with anti-slip material in accordance with one or more embodiments of the present disclosure, taken through the line "A-A" of FIG. 5. As shown in FIG. 2, the bowl includes a rigid first shell 210, a rigid second shell 212, and an anti-slip material 214.

The rigid first shell 210 can include a base 216 of the rigid first shell 210 and an outer wall 220. The outer wall 220 can be attached to the base 216 in a continuous manner (e.g., circumferentially).

The rigid second shell 212 can include a base 218 of the rigid second shell 212 and an outer wall 222. The outer wall 222 can be attached to the base 218 in a continuous manner (e.g., circumferentially). Further, the base 218 of the rigid second shell 212 can include a number of non-continuous openings, as will be further described herein.

The anti-slip material 214 can be positioned between a lower side of the base 216 of the rigid first shell 210 and an upper side of the base 218 of the rigid second shell 212. Further, the anti-slip material 214 can include a number of non-continuous concentric protrusions 224. The non-continuous concentric protrusions 224 can protrude through the number of non-continuous openings in the base 218 of the rigid second shell 212, as will be further described herein.

The outer wall 220 of the rigid first shell 210 can be adjacent with the outer wall 222 of the rigid second shell 212. For instance, outer wall 220 and outer wall 222 can share the same angle relative to the base of each respective rigid shell. For example, the angle between the base 216 of the rigid first shell 210 and outer wall 220 of the rigid first shell 210 can be the same as the angle between the base 218 of the rigid second shell 212 and outer wall 222 of the rigid second shell 212 (e.g., both angles 120°). The shared angle can result in outer wall 220 and outer wall 222 being adjacent to each other.

A portion of the rigid first shell 210 can be positioned within the rigid second shell 212. For example, the rigid first shell 210 can fit within the rigid second shell 212. The outer wall 220 of the rigid first shell 210 and outer wall 222 of the rigid second shell 212 can be adjacent to one another. Further, the outer wall 220 of the rigid first shell 210 can be longer than the outer wall 222 of the rigid second shell 212.

Figure 3:
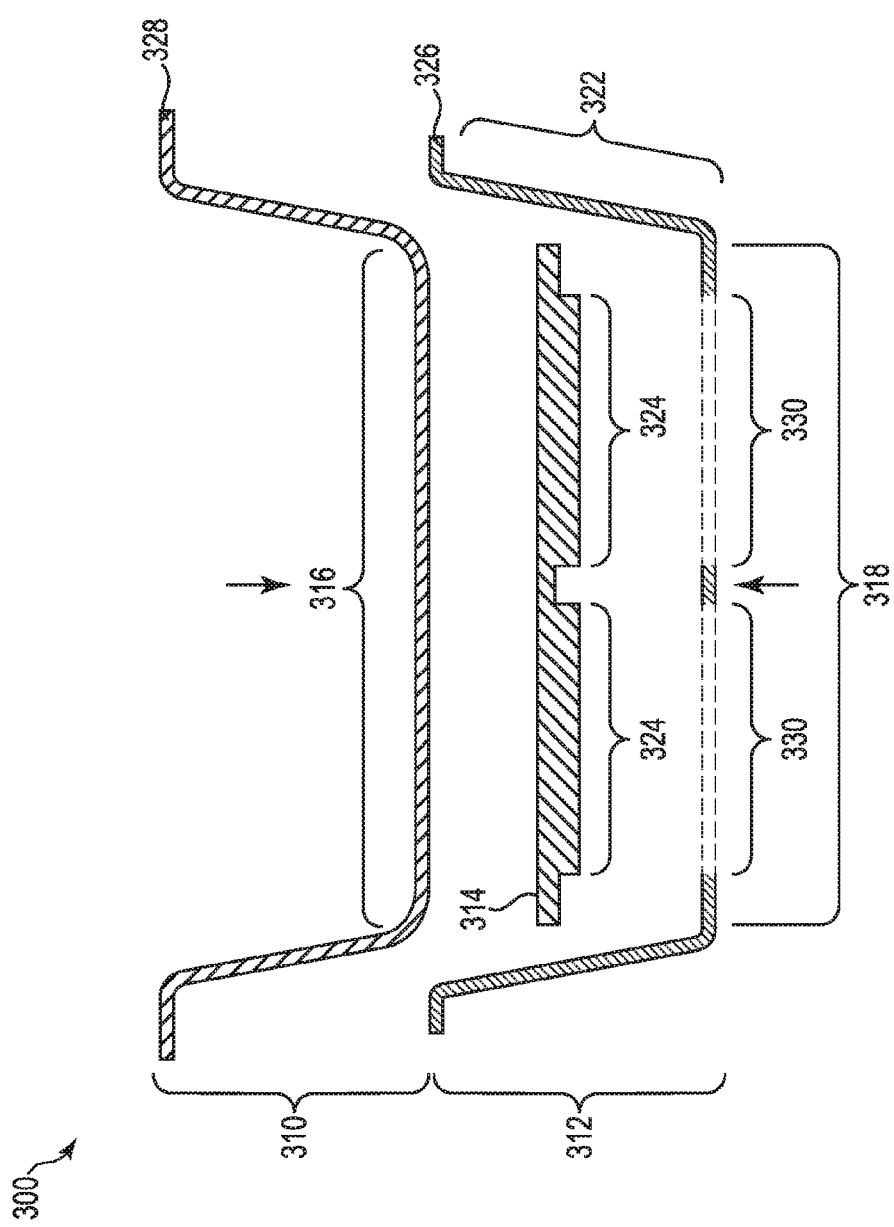
FIG. 3 illustrates a cross-sectional exploded view of a bowl with anti-slip material in accordance with one or more embodiments of the present disclosure, taken through the line "A-A" of FIG. 5.

FIG. 3 illustrates a cross-sectional exploded view of a bowl 300 with anti-slip material in accordance with one or more embodiments of the present disclosure, taken through the line "A-A" of FIG. 5. In FIG. 3, the rigid first shell 310, rigid second shell 312, and anti-slip material 314 are shown prior to being manufactured (e.g., assembled).

Manufacturing the bowl 300 with anti-slip material can include placing the anti-slip material 314 on the base 318 of the rigid second shell 312. The rigid second shell 312 can include a ledge 326 located on the upper edge of the outer wall 322 of the rigid second shell 312.

In various embodiments, manufacturing the bowl 300 with anti-slip material can include attaching the anti-slip material 314 to the base 318 of the rigid second shell 312. For example, attaching anti-slip material 314 can include securing the anti-slip material 314 to the base 318 of the rigid second shell 312 with an adhesive. As a further example, a heat process (e.g., plastic welding) can be used to attach anti-slip material 314 to the base 318 of the rigid second shell 312.

Placing the anti-slip material 314 on the base 318 can include aligning the non-continuous concentric protrusions 324 located on anti-slip material 314 with non-continuous concentric openings 330 located on the base 318 of the rigid second shell 312. Aligning the non-continuous concentric protrusions 324 with the non-continuous concentric openings 330 can allow for the non-continuous concentric protrusions 324 to protrude through the base 318 of the rigid second shell 312 via the non-continuous concentric openings 330.

The anti-slip material 314 can have the same dimensions as the base 318 of the rigid first shell 310. For example, the dimensions of the base 318 of the rigid first shell 310 and the dimensions of the anti-slip material 314 can be the same (e.g., circles with radii of 2 inches).

Manufacturing the bowl 300 with anti-slip material can include placing the rigid first shell 310 within the rigid second shell 312. The base 318 of the rigid second shell 312 can be larger than the base 316 of the rigid first shell 310. For example, the base 318 of the second shell 312 can have a diameter that is larger than the base 316 of the rigid first shell 310 to allow the base 316 of the rigid first shell 310 to be positioned adjacent to the anti-slip material 314.

Manufacturing the bowl 300 with anti-slip material can include applying pressure to the rigid first shell 310 and rigid second shell 312 in opposite directions to force the non-continuous protrusions 324 on the anti-slip material 314 to further protrude through the non-continuous openings 330 at the base 318 of the rigid second shell 312.

In various embodiments, manufacturing the bowl 300 can include applying pressure to the rigid first shell 310 to force the non-continuous protrusions 324 on the anti-slip material 314 to further protrude through the non-continuous openings 330 at the base 318 of the rigid second shell 312.

In various embodiments, manufacturing the bowl 300 can include applying pressure to the rigid second shell 312 to force the non-continuous protrusions 324 on the anti-slip material 314 to further protrude through the non-continuous openings 330 at the base 318 of the rigid second shell 312.

Manufacturing the bowl 300 with anti-slip material can include folding an upper edge 328 of the rigid first shell 310 around the ledge 326 located on the upper edge of the outer wall 322 of the rigid second shell 312. For instance, folding an upper edge 328 around the ledge 326 creates a lip (e.g., lip 432 illustrated in FIG. 4) that secures the rigid first shell 310 to the rigid second shell 312, as will be further described herein.

In some embodiments, the anti-slip material 314 is not removable. For example, securing the rigid first shell 310 to the rigid second shell 312 secures the anti-slip material 314 between the rigid first shell 310 and the rigid second shell 312.

In various embodiments, manufacturing the bowl 300 with anti-slip material can include manufacturing bowls of different sizes. For example, the bowl 300 can be a 16-ounce bowl. As another example, the bowl 300 can be a 32-ounce bowl. However, embodiments of the present disclosure are not so limited. For example, the bowl 300 can be any suitable size.

Figure 4:
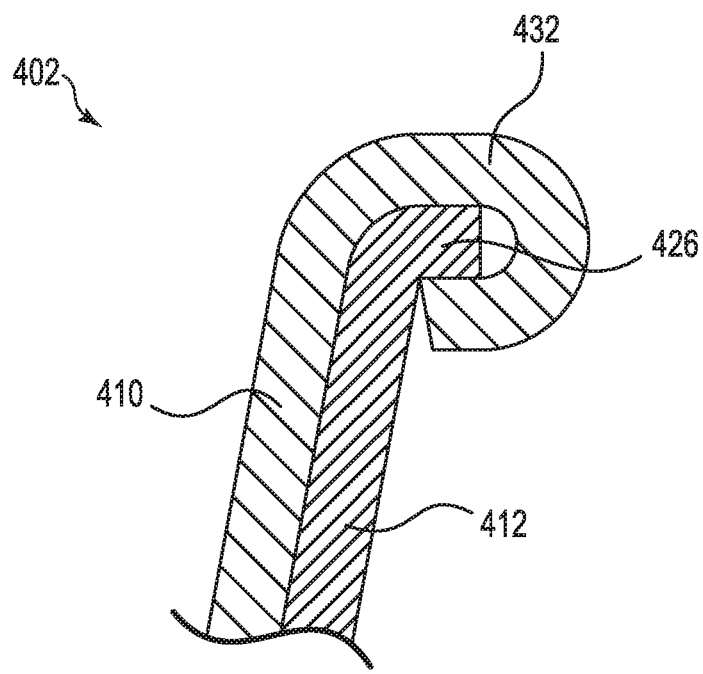
FIG. 4 illustrates a magnified view of the area designated "B" in FIG. 2 of a bowl with anti-slip material in accordance with one or more embodiments of the present disclosure.

FIG. 4 illustrates a magnified view 402 of the area designated "B" in FIG. 2 of a bowl with anti-slip material in accordance with one or more embodiments of the present disclosure. As shown in FIG. 4, the bowl (e.g., bowl 200 illustrated in FIG. 2) includes a rigid first shell 410, a rigid second shell 412, a ledge 426, and a lip 432.

The ledge 426 can be a ledge located at an upper edge of the outer wall of the rigid second shell 412. The ledge 426 can extend horizontally in a direction away from the rigid second shell 412. The ledge can be continuously connected to the upper edge of the outer wall of the rigid second shell 412 (e.g., circumferentially).

The lip 432 can be a lip that encircles the ledge 426 in a continuous manner (e.g., circumferentially). The lip 432 can secure the rigid first shell 410 to the rigid second shell 412. For example, the lip 432 prevents the rigid first shell 410 from being disassembled from the rigid second shell 412.

FIG. 5 illustrates a bottom view of a bowl 500 with anti-slip material in accordance with one or more embodiments of the present disclosure. As shown in FIG. 5, the bowl includes a rigid first shell 510, a rigid second shell 512, and an anti-slip material 514.

The anti-slip material 514 can include a number of non-continuous protrusions 524. Additionally, although not shown in FIG. 5, the rigid second shell 512 can include a number of non-continuous openings. The number of non-continuous protrusions 524 of the anti-slip material 514 can be the same as the number of non-continuous openings of the rigid second shell 512. When aligned, the number of non-continuous protrusions 524 can protrude through the base of the rigid second shell 512.

Although the number of non-continuous protrusions 524 is shown in FIG. 5 as being concentric, embodiments of the present disclosure are not so limited. For example, the number of non-continuous protrusions 524 can be arranged in a pattern that is non-concentric.

The number of non-continuous protrusions 524 can include grooves 534. Grooves 534 can increase the resistance of the anti-slip material 514 (e.g., when in use by an animal). For example, grooves 534 can help to prevent the bowl from moving (e.g., sliding or skidding) when an animal is eating or drinking from the bowl.

Figure 6:
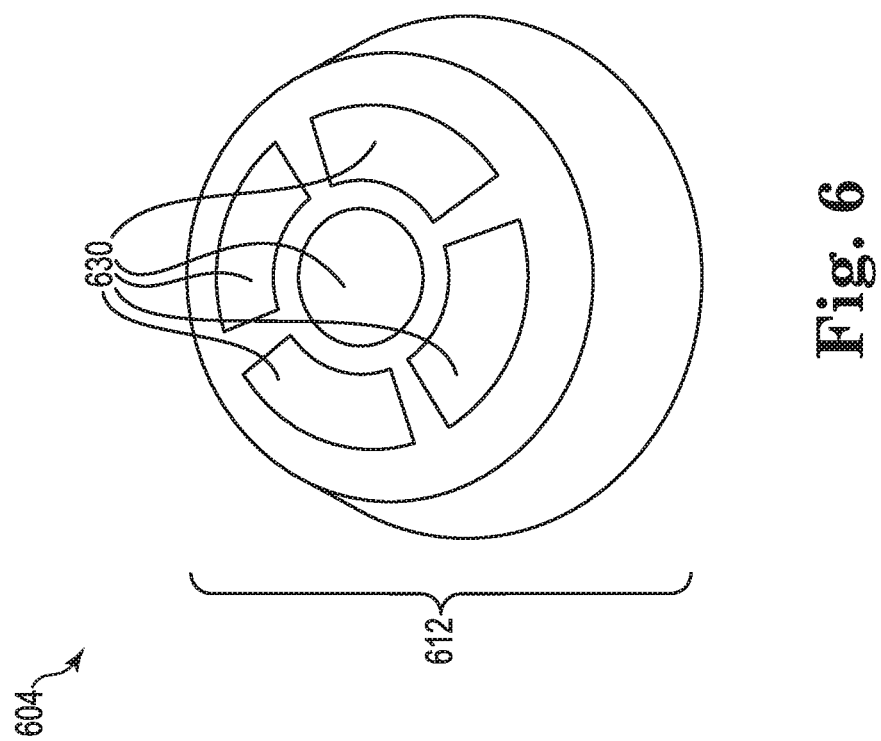
FIG. 6 illustrates a view of a rigid second shell in accordance with one or more embodiments of the present disclosure.

FIG. 6 illustrates a view 604 of a rigid second shell 612 in accordance with one or more embodiments of the present disclosure. As shown in FIG. 6, rigid second shell 612 includes a number of non-continuous openings 630.

Although the number of non-continuous openings 630 is shown in FIG. 6 as being concentric, embodiments of the present disclosure are not so limited. For example, the number of non-continuous openings 630 can be arranged in a pattern or random arrangement that is non-concentric.

Additionally, although five non-continuous openings are shown in FIG. 6, embodiments of the present disclosure are not so limited. For example, the number of non-continuous openings can be less than five or more than five.

Figure 7:
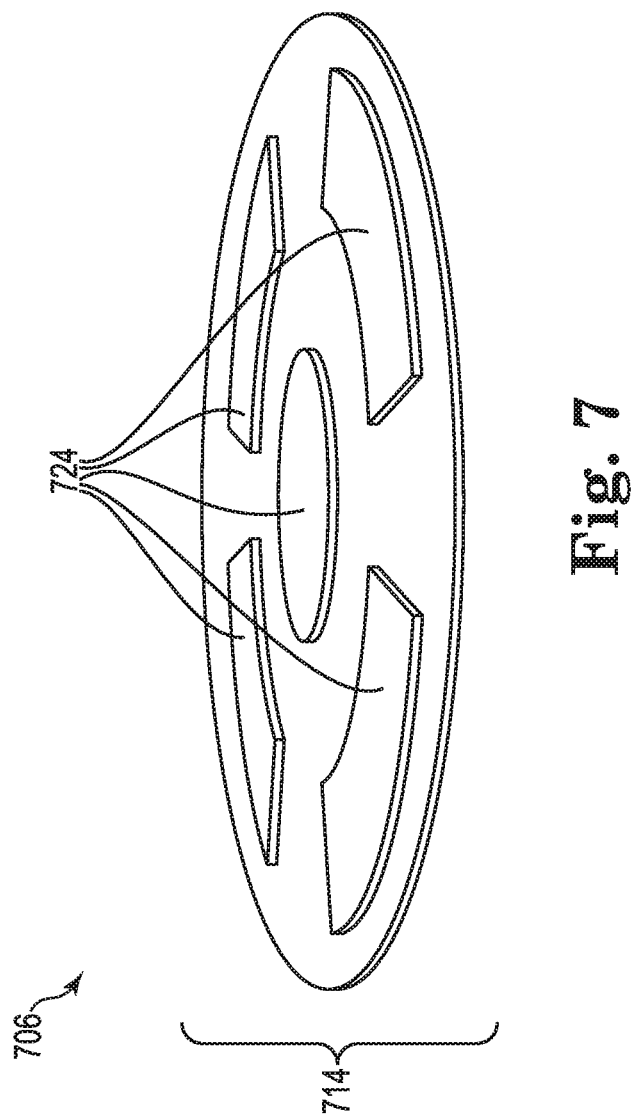
FIG. 7 illustrates a view of an anti-slip material in accordance with one or more embodiments of the present disclosure.

FIG. 7 illustrates a view 706 of an anti-slip material 714 in accordance with one or more embodiments of the present disclosure. As shown in FIG. 7, the anti-slip material 714 includes a number of non-continuous protrusions 724.

The number of non-continuous protrusions 724 can be the same height. For example, each of the number of non-continuous protrusions 724 can be the same height (e.g., 0.25 inches) extending from the base of the anti-slip material 714. The number of non-continuous protrusions 724 having the same height can ensure that the bowl is not tilted (e.g. remains flat) when in use.

Although five non-continuous protrusions 724 are shown in FIG. 7, embodiments of the present disclosure are not so limited. For example, the number of non-continuous protrusions 724 can be less than five or more than five.

Figure 8A:
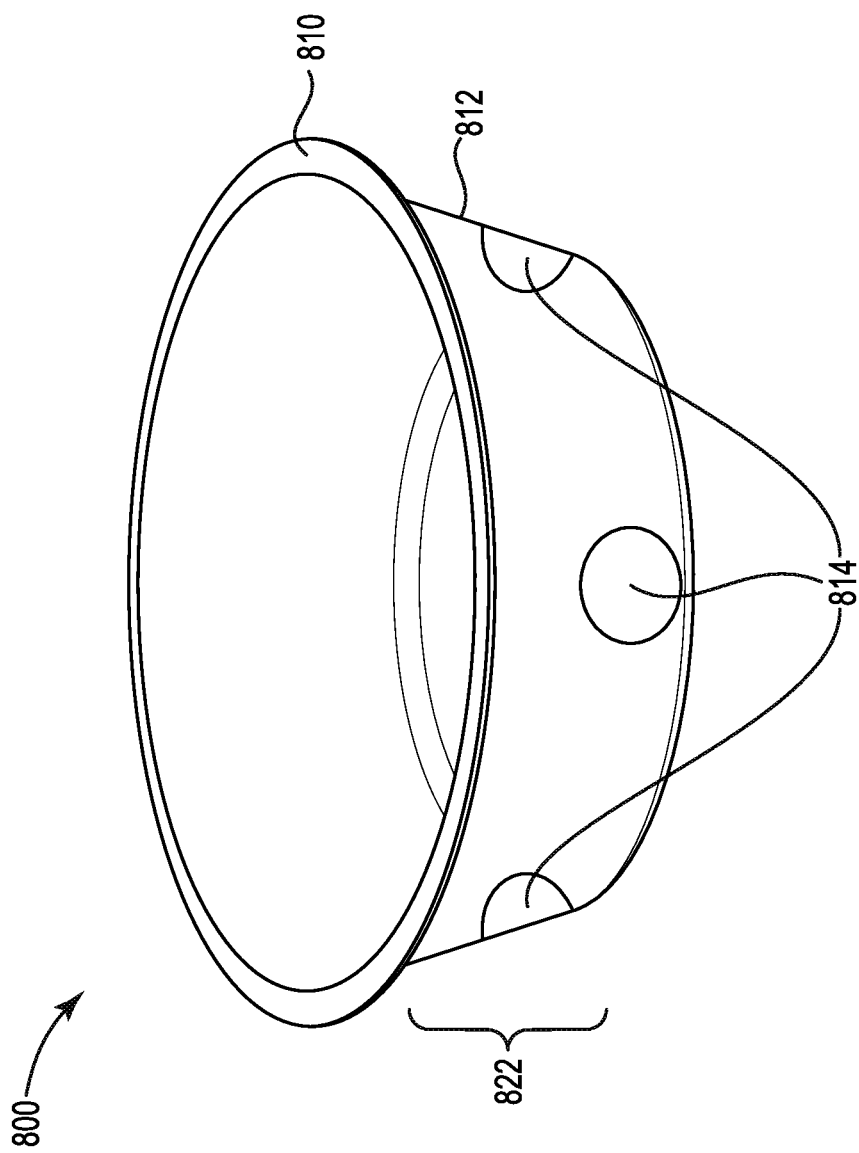
FIG. 8A illustrates a side view of a bowl with anti-slip material in accordance with one or more embodiments of the present disclosure.

FIG. 8A illustrates a side view of a bowl 800 with anti-slip material 814 in accordance with one or more embodiments of the present disclosure. As shown in FIG. 8A, the bowl 800 includes a rigid first shell 810, a rigid second shell 812, and an anti-slip material 814.

The rigid first shell 810 can be a material that is resistant to physical deterioration (e.g., scratching, pitting, and/or rusting) when subjected to use (e.g., comprising animal feed or water). For example, the rigid first shell 810 can be stainless steel. However, embodiments of the present disclosure are not so limited. For example, the rigid first shell 810 can be another material that is resistant to physical deterioration, such as plastic or copper.

The rigid second shell 812 can be a plastic material. For example, the rigid second shell 812 can be an injection molded plastic or any other type of plastic material that can be formed into a rigid shell. Additionally, the type of plastic material for the rigid second shell 812 can be selected based on aesthetic considerations (e.g., color, receptiveness to paint and/or ink, etc.). In some examples, rigid second shell 812 may be a non-plastic material that can be formed into a rigid shell. For instance, the rigid second shell 812 can be a material that is resistant to physical deterioration similar to or the same as a material of the rigid first shell 810. In some examples, the rigid second shell 812 can be a stainless steel material. In some examples, the rigid second shell 812 can be a copper material.

The rigid second shell 812 can include a number of openings. The number of openings can be on the outer wall 822 of the rigid second shell 812. The anti-slip material 814 can be positioned between the rigid first shell 810 and the rigid second shell 812 and can protrude through the number of openings on the outer wall 822 of the rigid second shell 812.

The anti-slip material 814 can be a material that is resistant to movement (e.g., slipping or skidding) when experiencing a horizontal and/or a substantially horizontal force. For example, anti-slip material 814 can be an elastomeric rubber material. However, embodiments of the present disclosure are not so limited. For example, the anti-slip material 814 can be any other material that resists movement when experiencing a horizontal and/or a substantially horizontal force.

As shown in FIG. 8A, the anti-slip material 814 can be in the shape of circles on the outer wall 822 of the rigid second shell 812. The circular shaped anti-slip material 814 can protrude through the outer wall 822 of the rigid second shell 812 via the number of openings of the rigid second shell 812.

Although not shown in FIG. 8A, a base of bowl 800 can include a number of openings. For example, the bowl 800 can include a number of openings on the outer wall 822 of the rigid second shell 812, as well as on a base of the rigid second shell 812, as will be further described with respect to FIG. 8B.

Although anti-slip material 814 is shown in FIG. 8A as being circular shaped, embodiments of the present disclosure are not so limited. For example, anti-slip material 814 may be in a rectangular shape, and/or in any other shape (e.g., as will be further described herein with respect to FIGS. 9-14).

Although anti-slip material 814 is shown in FIG. 8A as protruding through a number of openings on the outer wall 822 of the rigid second shell 812, embodiments of the present disclosure are not so limited. For example, the bowl 800 can include a number of openings that are on both a base of the rigid second shell 812 and the outer wall 822 of the rigid second shell 812. For instance, an opening of the number of openings may be a continuous opening on the base of the rigid second shell 812 and the outer wall 822 of the rigid second shell 812. The anti-slip material 814 can protrude continuously through the continuous opening on the base of the rigid second shell 812 and the outer wall 822 of the rigid second shell 812, as will be further described with respect to FIG. 14.

Figure 8B:
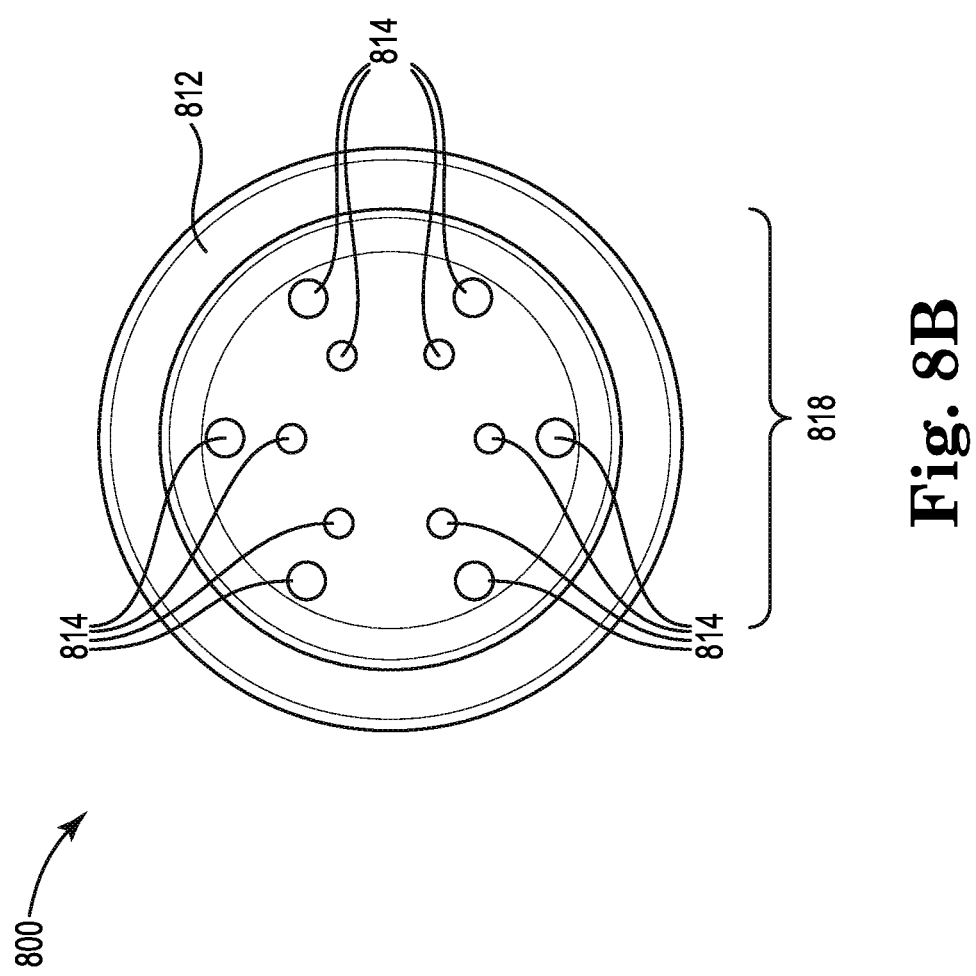
FIG. 8B illustrates a bottom view of a bowl in accordance with one or more embodiments of the present disclosure.

FIG. 8B illustrates a bottom view of a bowl 800 with anti-slip material 814 in accordance with one or more embodiments of the present disclosure. As shown in FIG. 8B, the bowl 800 includes a base 818, a rigid second shell 812, and an anti-slip material 814.

As shown in FIG. 8B, the base 818 of bowl 800 can include a number of openings. The number of openings can be non-continuous. The anti-slip material 814 can protrude through the number of openings of the base 818 of the rigid second shell 812.

Although the number of non-continuous openings are shown in FIG. 8B as being concentric, embodiments of the present disclosure are not so limited. For example, the number of non-continuous openings can be arranged in a pattern or random arrangement that is non-concentric.

As shown in FIG. 8B, the anti-slip material 814 can be in the shape of circles on the base 818 of the rigid second shell 812. The circular shaped anti-slip material 814 can protrude through the base 818 of the rigid second shell 812.

Although twelve non-continuous openings are shown in FIG. 8B, embodiments of the present disclosure are not so limited. For example, the number of non-continuous openings can be less than twelve or more than twelve. Further, although the number of non-continuous openings are illustrated in FIG. 8B as circles, any shape, for instance a bone or a fish, may be used. In some examples, some or all of the number of openings may be continuous. Although not shown in FIG. 8B, the bowl 800 can include a number of openings on the outer wall 822 of the rigid second shell 812, as previously described in connection with FIG. 8A.

Figure 9A:
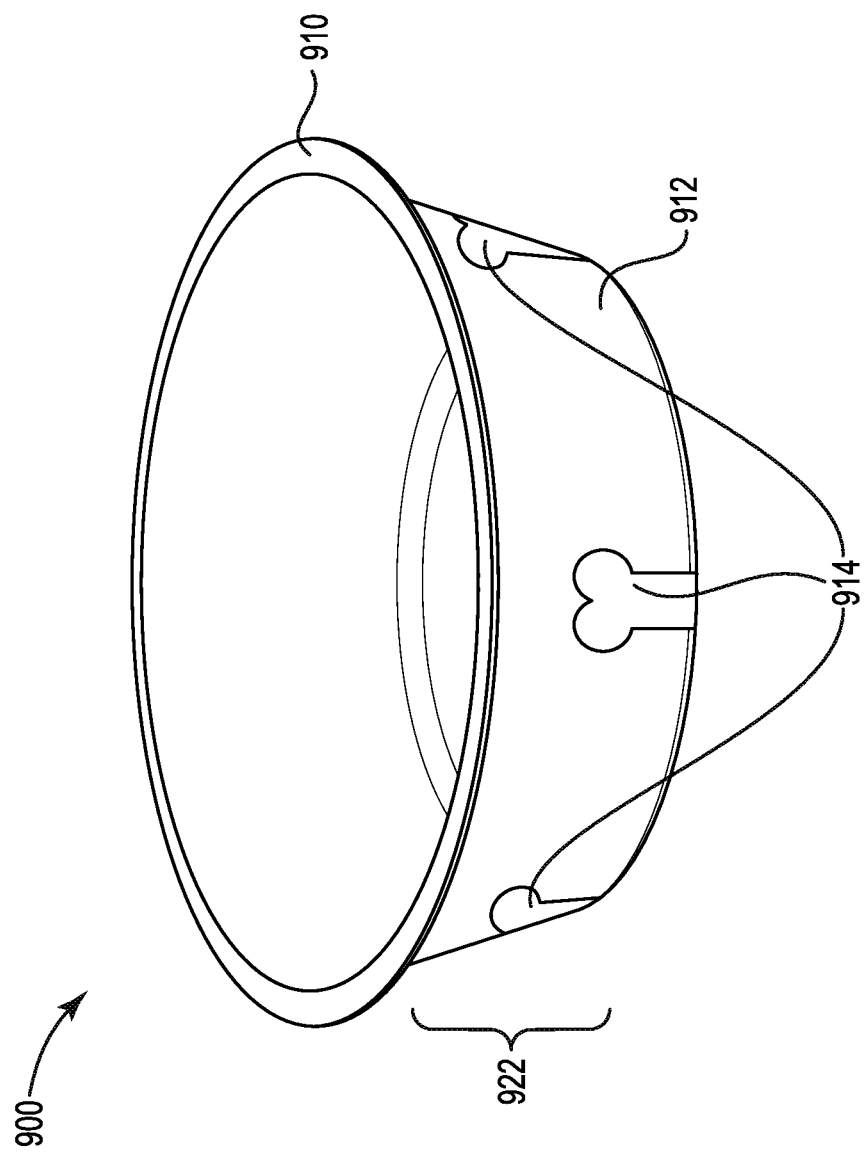
FIG. 9A illustrates a side view of a bowl with anti-slip material in accordance with one or more embodiments of the present disclosure.

FIG. 9A illustrates a side view of a bowl 900 with anti-slip material 914 in accordance with one or more embodiments of the present disclosure. As shown in FIG. 9A, the bowl 900 includes a rigid first shell 910, a rigid second shell 912, an outer wall 922 of the rigid second shell 912, and an anti-slip material 914.

The rigid second shell 912 can include a number of openings. The number of openings can be on the outer wall 922 of the rigid second shell 912. The anti-slip material 914 can be positioned between the rigid first shell 910 and the rigid second shell 912 and can protrude through the number of openings on the outer wall 922 of the rigid second shell 912.

As shown in FIG. 9A, the anti-slip material 914 can be in the shape of bones on the outer wall 922 of the rigid second shell 912. The bone shaped anti-slip material 914 can protrude through the outer wall 922 of the rigid second shell 912.

Although not shown in FIG. 9A, a base of bowl 900 can include a number of openings. For example, the bowl 900 can include a number of openings on the outer wall 922 of the rigid second shell 912, as well as on a base of the rigid second shell 912, as will be further described with respect to FIG. 9B.

Figure 9B:
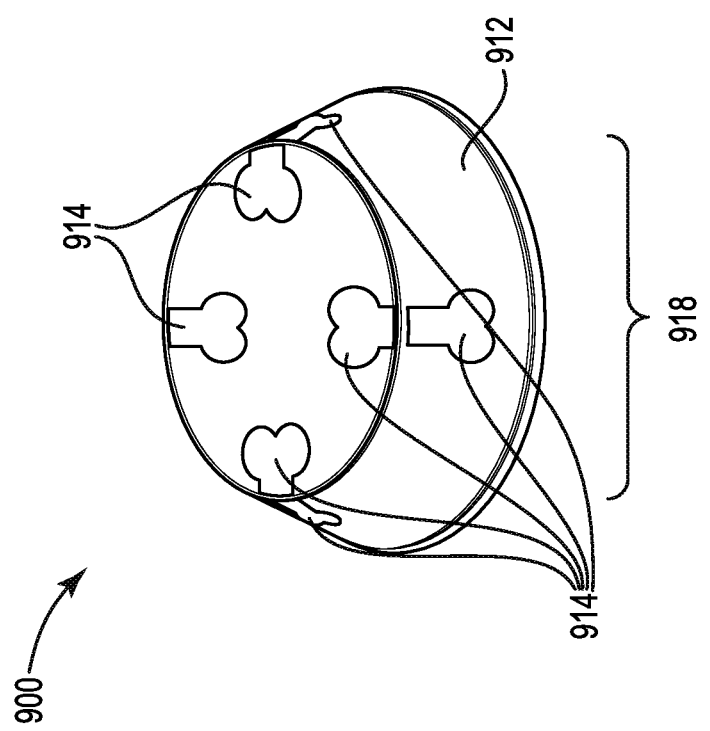
FIG. 9B illustrates a perspective view of a bowl with anti-slip material in accordance with one or more embodiments of the present disclosure.

FIG. 9B illustrates a perspective view of a bowl 900 with anti-slip material 914 in accordance with one or more embodiments of the present disclosure. As shown in FIG. 9B, the bowl 900 includes a rigid second shell 912, a base 918 of rigid second shell 912, an outer wall 922 of rigid second shell 912, and an anti-slip material 914.

As shown in FIG. 9B, the base 918 of rigid second shell 912 can include a number of openings. The number of openings can be non-continuous. The anti-slip material 914 can protrude through the number of openings of the base 918 of the rigid second shell 912.

Similar to the anti-slip material shown in FIG. 9A, the anti-slip material 914 can be in the shape of a bone. The bone shape can be vertical with respect to the shape of the bowl 900, although embodiments of the disclosure are not limited to a vertical shape. For instance, the bone shape can be at an angle relative to a vertically oriented bone shape. The bone shape can be on the base 918 of the rigid second shell 912. The bone shaped anti-slip material 914 can protrude through the base 918 of the rigid second shell 912.

Although anti-slip material 914 is shown in FIG. 9B as protruding through a number of openings on the outer wall 922 of the rigid second shell 912, embodiments of the present disclosure are not so limited. For example, the bowl 900 can include a number of openings that are on both a base of the rigid second shell 912 and the outer wall 922 of the rigid second shell 912. For instance, an opening of the number of openings may be a continuous opening on the base of the rigid second shell 912 and the outer wall 922 of the rigid second shell 912. Hence, the bone shaped anti-slip material 914 may be of a continuous opening on the base of the rigid second shell 912 and the outer wall 922 of the rigid second shell 912. The anti-slip material 914 can protrude continuously through the continuous opening on the base of the rigid second shell 912 and the outer wall 922 of the rigid second shell 912.

Figure 10:
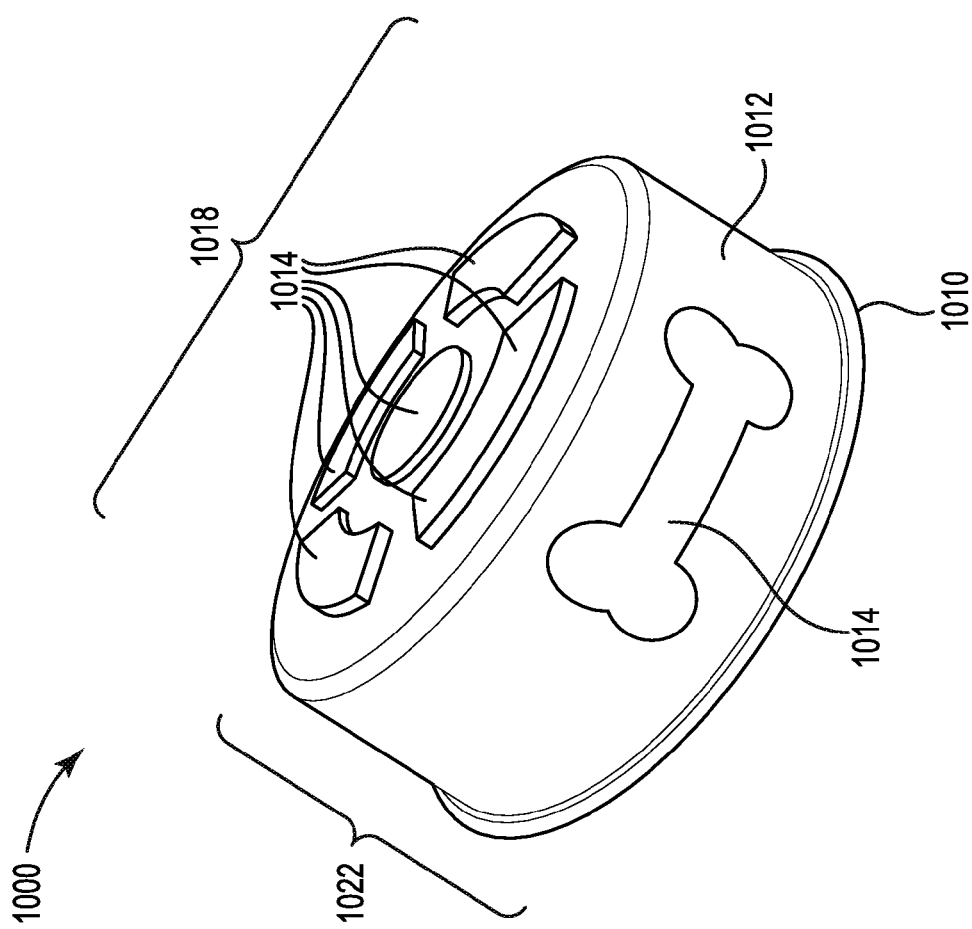
FIG. 10 illustrates a perspective view of a bowl with anti-slip material in accordance with one or more embodiments of the present disclosure.

FIG. 10 illustrates a perspective view of a bowl 1000 with anti-slip material 1014 in accordance with one or more embodiments of the present disclosure. As shown in FIG. 10, the bowl 1000 includes a rigid first shell 1010, a rigid second shell 1012, an outer wall 1022 of the rigid second shell 1012, base 1018 of the rigid second shell 1012, and an anti-slip material 1014.

The bowl 1000 can include a number of openings on the base 1018 of the rigid second shell 1012, as well as a number of openings on the outer wall 1022 of the rigid second shell

1012. The anti-slip material 1014 can be positioned between the rigid first shell 1010 and the rigid second shell 1012 and can protrude through the number of openings on the outer wall 1022 of the rigid second shell 1012 and through the number of openings on the base 1014 of the rigid second shell 1012.

As shown in FIG. 10, the anti-slip material 1014 can be in the shape of bones on the outer wall 1022 of the rigid second shell 1012, and can be concentric and non-continuously shaped on the base 1018 of the rigid second shell 1012. The bone shaped anti-slip material 1014 can protrude through the outer wall 1022 of the rigid second shell 1012. The concentric and non-continuously shaped anti-slip material 1014 can protrude through the base 1018 of the rigid second shell 1012.

Figure 11:
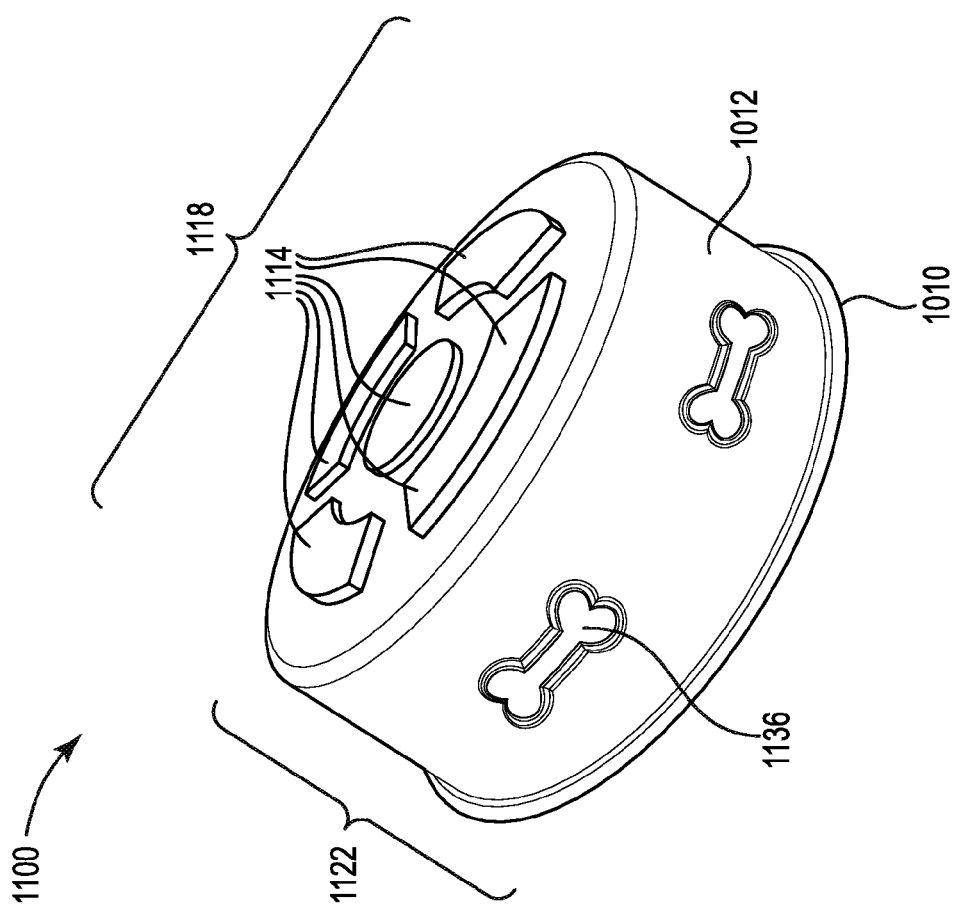
FIG. 11 illustrates a perspective view of a bowl with anti-slip material in accordance with one or more embodiments of the present disclosure.

FIG. 11 illustrates a perspective view of a bowl 1100 with anti-slip material 1114 in accordance with one or more embodiments of the present disclosure. As shown in FIG. 11, the bowl 1100 includes a rigid first shell 1110, a rigid second shell 1112, an outer wall 1122 of the rigid second shell 1112, a base 1118 of the rigid second shell 1112, and an anti-slip material 1114.

The bowl 1100 can include a number of openings on the base 1118 of the rigid second shell 1112. The anti-slip material 1114 can be positioned between the rigid first shell 1110 and the rigid second shell 1112 and can protrude through the number of openings on the base 1114 of the rigid second shell 1112.

The rigid second shell 1112 can include a protrusion 1136. The protrusion 1136 can be a bulge in the material of rigid second shell 1112. As shown in FIG. 11, the protrusion 1136 can be in the shape of a bone, although embodiments of the present disclosure are not limited to a protrusion 1136 in the shape of a bone. For instance, the protrusion may be in the shape of a fish, a dog, a cat, or any other shape.

Further, as illustrated in FIG. 11, the rigid second shell 1112 includes one protrusion 1136. However, embodiments of the present disclosure are not limited to one protrusion 1136. For example, the rigid second shell 1112 can have more than one protrusion 1136.

Figure 12A:
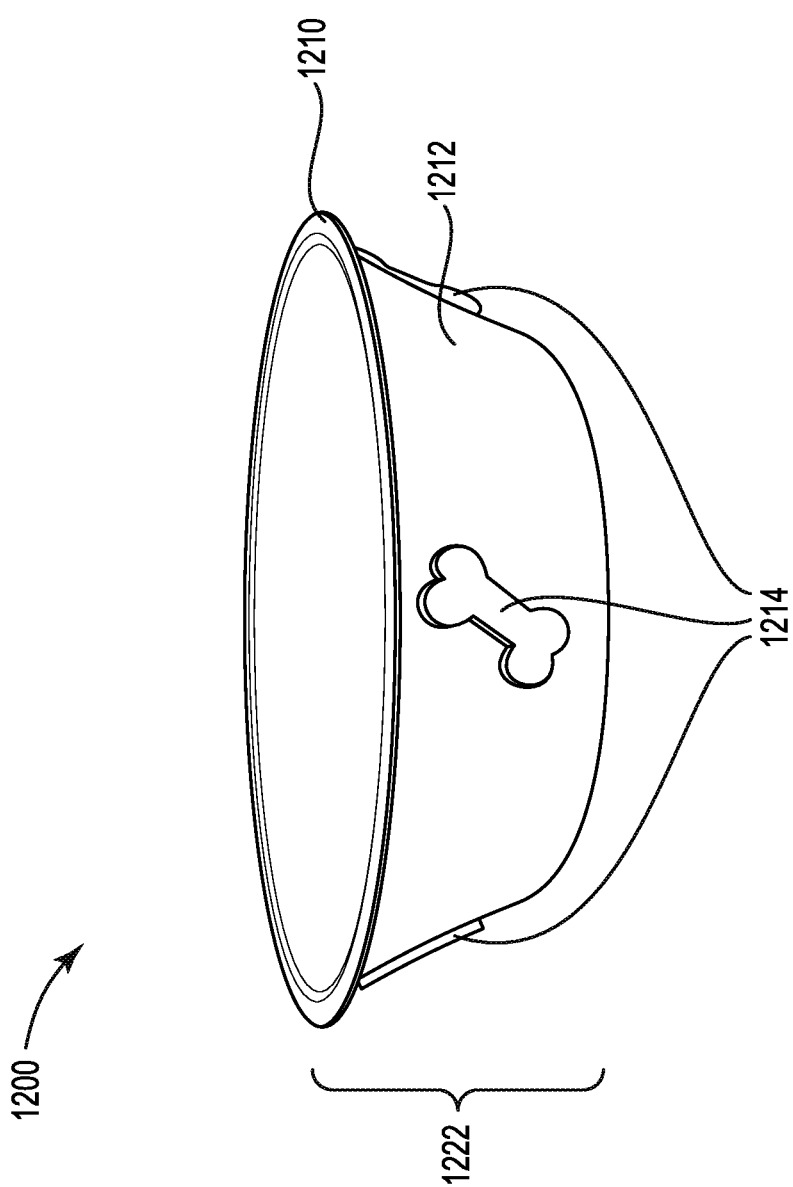
FIG. 12A illustrates a side view of a bowl with anti-slip material in accordance with one or more embodiments of the present disclosure.

FIG. 12A illustrates a side view of a bowl 1200 with anti-slip material 1214 in accordance with one or more embodiments of the present disclosure. As shown in FIG. 12A, the bowl 1200 includes a rigid first shell 1210, a rigid second shell 1212, an outer wall 1222 of the rigid second shell 1212, and an anti-slip material 1214.

The rigid second shell 1212 can include a number of openings. The number of openings can be on the outer wall 1222 of the rigid second shell 1212. The anti-slip material 1214 can be positioned between the rigid first shell 1210 and the rigid second shell 1212 and can protrude through the number of openings on the outer wall 1222 of the rigid second shell 1212.

As shown in FIG. 12A, the anti-slip material 1214 can be in the shape of bones on the outer wall 1222 of the rigid second shell 1212. The bone shaped anti-slip material 1214 can protrude through the outer wall 1222 of the rigid second shell 1212.

As shown in FIG. 12A, the anti-slip material 1214 can be in the shape of a bone, although embodiments of the present disclosure are not limited to the anti-slip material 1214 in the shape of a bone. For instance, the anti-slip material protruding from the outer wall 1222 of the rigid second shell 1212 may be in the shape of a fish, a dog, a cat, or any other shape.

Although not shown in FIG. 12A, a base of bowl 1200 can include a number of openings. For example, the bowl 1200 can include a number of openings on the outer wall 1222 of the rigid second shell 1212, as well as on a base of the rigid second shell 1212, as will be further described with respect to FIG. 12B.

As shown in FIG. 12A, the bone shaped anti-slip material 1214 is oriented at an angle relative to the shape of the bowl. However, embodiments of the present disclosure are not limited to the angled orientation of the bone shaped anti-slip material 1214. For example, the bone shaped anti-slip material 1214 can be oriented in any other angle relative to the shape of the bowl.

Although anti-slip material 1214 is shown in FIG. 12A as protruding through a number of openings on the outer wall 1222 of the rigid second shell 1212, embodiments of the present disclosure are not so limited. For example, the bowl 1200 can include a number of openings that are on both a base of the rigid second shell 1212 and the outer wall 1222 of the rigid second shell 1212. For instance, an opening of the number of openings may be a continuous opening on the base of the rigid second shell 1212 and the outer wall 1222 of the rigid second shell 1212. Hence, the bone shaped anti-slip material 1214 may be a continuous opening on the base of the rigid second shell 1212 and the outer wall 1222 of the rigid second shell 1212. The anti-slip material 1214 can protrude continuously through the continuous opening on the base of the rigid second shell 1212 and the outer wall 1222 of the rigid second shell 1212.

Figure 12B:
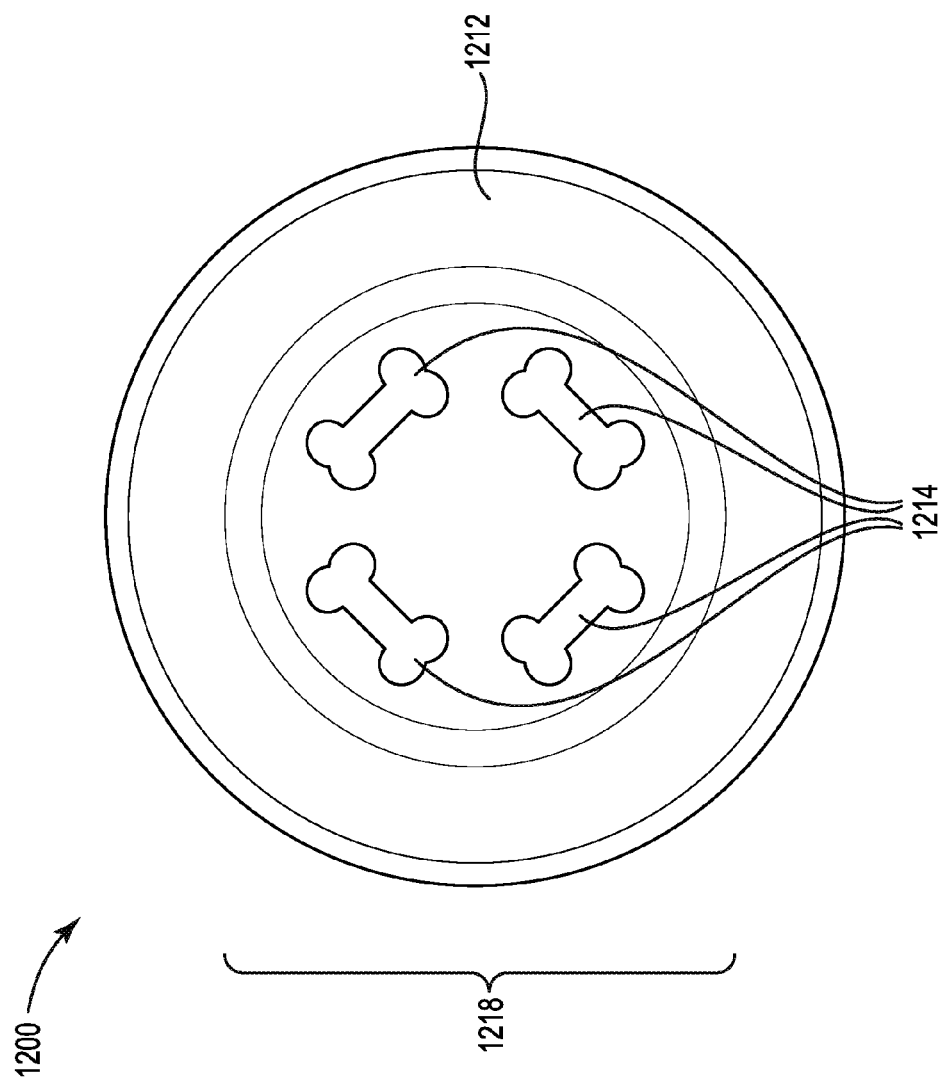
FIG. 12B illustrates a bottom view of a bowl with anti-slip material in accordance with one or more embodiments of the present disclosure.

FIG. 12B illustrates a bottom view of a bowl 1200 with anti-slip material in accordance with one or more embodiments of the present disclosure. As shown in FIG. 12B, the bowl 1200 includes a rigid second shell 1212, a base 1218 of the rigid second shell 1212, and an anti-slip material 1214.

As shown in FIG. 12B, the base 1218 of bowl 1200 can include a number of openings. The number of openings can be in the shape of a bone. The anti-slip material 1214 can protrude through the number of openings of the base 1218 of the rigid second shell 1212.

As shown in FIG. 12B, the anti-slip material 1214 protruding from the base 1218 of the rigid second shell 1212 can be in the shape of a bone, although embodiments of the present disclosure are not limited to the anti-slip material 1214 in the shape of a bone. For instance, the anti-slip material may be in the shape of a fish, a dog, a cat, or any other shape.

Figure 13:
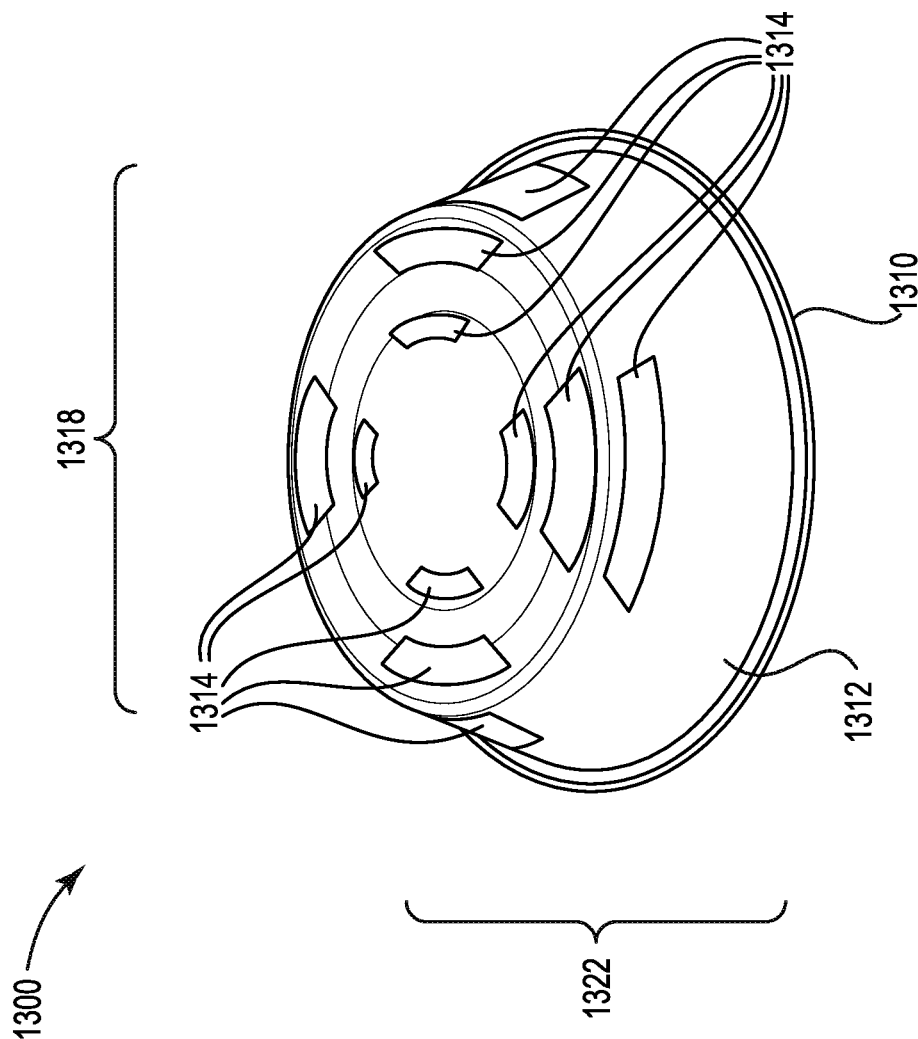
FIG. 13 illustrates a perspective view of a bowl with anti-slip material in accordance with one or more embodiments of the present disclosure.

FIG. 13 illustrates a perspective view of a bowl 1300 with anti-slip material 1314 in accordance with one or more embodiments of the present disclosure. As shown in FIG. 13, the bowl 1300 includes a rigid first shell 1310, a rigid second shell 1312, a base 1318 of rigid second shell 1312, an outer wall 1322 of rigid second shell 1312, and an anti-slip material 1314.

As shown in FIG. 13, the base 1318 of rigid second shell 1312 and the outer wall 1322 of the rigid second shell 1312 can include a number of openings. The number of openings can be non-continuous. The anti-slip material 1314 can be positioned between the rigid first shell 1310 and the rigid second shell 1312 and can protrude through the number of openings of the base 1318 of the rigid second shell 1312, as well as the number of openings of the outer wall 1322 of the rigid second shell 1312.

Although the number of non-continuous openings of the base 1318 of the rigid second shell 1312 are shown as being concentric, embodiments of the present disclosure are not so limited. For example, the number of non-continuous openings can be arranged in a pattern or random arrangement that is non-concentric.

Figure 14:
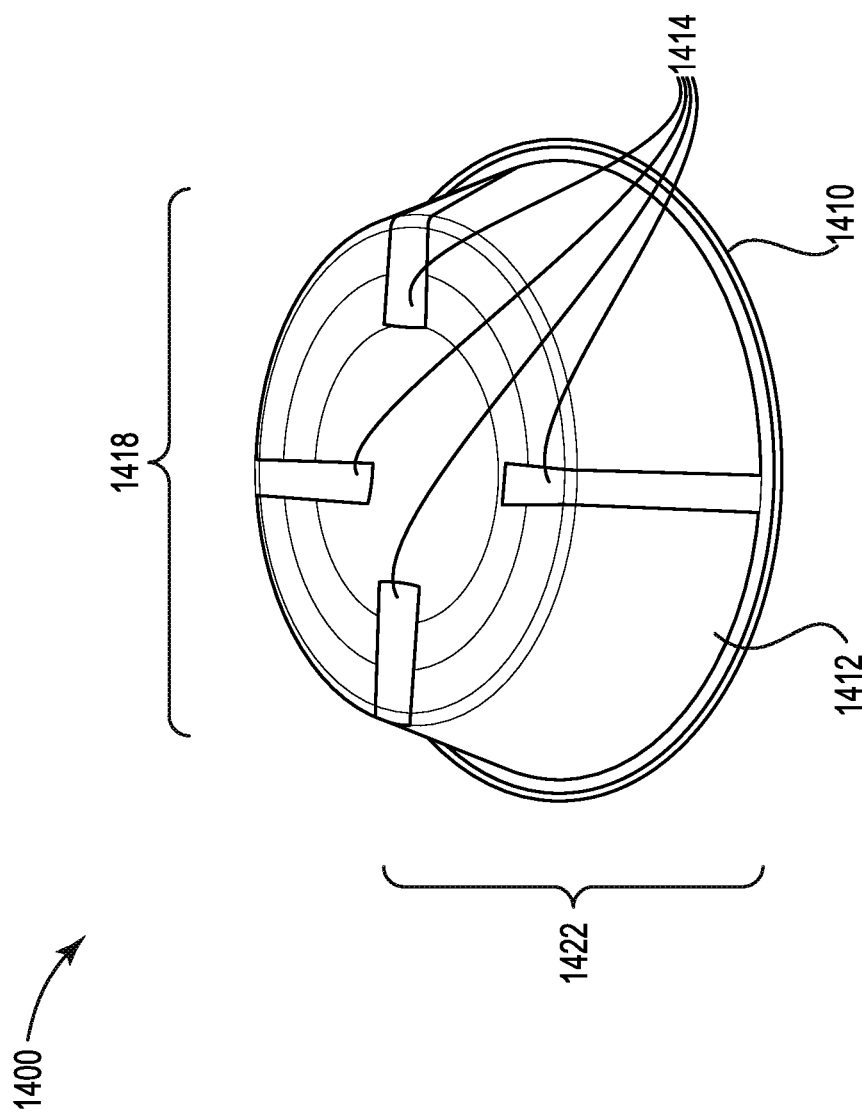
FIG. 14 illustrates a perspective view of a bowl with anti-slip material in accordance with one or more embodiments of the present disclosure.

FIG. 14 illustrates a perspective view of a bowl 1400 with anti-slip material 1414 in accordance with one or more embodiments of the present disclosure. As shown in FIG. 14, the bowl 1400 includes a rigid first shell 1410, a rigid second shell 1412, a base 1418 of rigid second shell 1412, an outer wall 1422 of rigid second shell 1412, and an anti-slip material 1414.

As shown in FIG. 14, both the base 1418 of rigid second shell 1412 and the outer wall 1422 of the rigid second shell 1412 can include a number of openings. At least one of the number of openings may be a continuous opening on the base 1418 of the rigid second shell 1412 and the outer wall 1422 of the rigid second shell 1412. Hence, the anti-slip material 1414 may be a continuous opening on the base 1418 of the rigid second shell 1412 and the outer wall 1422 of the rigid second shell 1412. The anti-slip material 1414 can be positioned between the rigid first shell 1410 and the rigid second shell 1412 and can protrude continuously through the continuous opening on the base 1418 of the rigid second shell 1412 and the outer wall 1422 of the rigid second shell 1412.

As shown in FIG. 14, the anti-slip material 1414 can be shaped in a rectangular shape. However, embodiments of the present disclosure are not so limited. For example, the anti-slip material 1414 may be in the shape of a fish, a dog, a cat, or any other shape.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

These embodiments are described in sufficient detail to enable those of ordinary skill in the art to practice one or more embodiments of this disclosure. It is to be understood that other embodiments may be utilized and that process and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A bowl, comprising:
a rigid first shell including a base and an outer wall continuously attached to the base;
a rigid second shell including a base and an outer wall continuously attached to the base; and
an anti-slip material positioned between the rigid first shell and the rigid second shell and protruding through a plurality of openings on the rigid second shell,
wherein at least one of the plurality of openings is a continuous opening on the base of the rigid second shell and the outer wall of the rigid second shell; and
wherein the anti-slip material protrudes continuously through the at least one continuous opening.

2. The bowl of claim 1, wherein the plurality of openings are on the base of the rigid second shell.

3. The bowl of claim 1, wherein the plurality of openings are on the outer wall of the rigid second shell.

4. The bowl of claim 1, wherein the plurality of openings are on a base and the outer wall of the rigid second shell.

5. The bowl of claim 1, wherein the rigid second shell includes a protrusion.

6. The bowl of claim 1, wherein a portion of the rigid first shell is positioned within the rigid second shell.

7. The bowl of claim 1, wherein an upper edge of the outer wall of the rigid second shell includes a ledge extending away from the rigid first shell.

8. The bowl of claim 7, wherein an upper edge of the outer wall of the rigid first shell includes a lip that encircles the ledge of the rigid second shell securing the rigid second shell to the rigid first shell.

9. The bowl of claim 1, wherein:
the base of the rigid second shell is larger than the base of the rigid first shell; and
the outer wall of the rigid first shell and the outer wall of the rigid second shell are adjacent.

10. A method of manufacturing a bowl, comprising:
arranging an anti-slip material between a rigid first shell and a rigid second shell, wherein the rigid second shell includes a ledge located on an upper edge of an outer wall of the rigid second shell and wherein a base of the anti-slip material has a same radius as a base of the rigid second shell;
aligning a plurality of protrusions located on the anti-slip material with a plurality of openings located on the base of the rigid second shell and an outer wall of the rigid second shell; and
applying pressure to the rigid first shell and the rigid second shell such that the plurality of protrusions protrude through the plurality of openings.

11. The method of claim 10, further including folding an upper edge of the rigid first shell around the ledge of the rigid second shell to form a lip securing the rigid second shell to the rigid first shell.

12. The method of claim 10, further including applying pressure in opposite directions to the rigid first shell and the rigid second shell.

13. A bowl, comprising:
a rigid first shell including a base and an outer wall continuously attached to the base;
a rigid second shell including a base and an outer wall continuously attached to the base, wherein the base of the rigid second shell and an outer wall of the rigid second shell include a plurality of non-continuous openings; and
an anti-slip material positioned between a lower side of the base of the rigid first shell and an upper side of the base of the rigid second shell,
wherein a base of the anti-slip material has a same radius as the base of the rigid second shell; and wherein the anti-slip material includes a plurality of non-continuous protrusions, and wherein the plurality of non-continuous protrusions protrude through the plurality of non-continuous openings in the base of the rigid second shell.

14. The bowl of claim 13, wherein the rigid first shell is a stainless steel material.

15. The bowl of claim 13, wherein the rigid second shell is a plastic material.

16. The bowl of claim 13, wherein the rigid second shell is a stainless steel material.

17. The bowl of claim 13, wherein the anti-slip material is an elastomeric rubber material.

\* \* \* \* \*